(12) United States Patent
Suzuki

(10) Patent No.: US 7,667,756 B2
(45) Date of Patent: Feb. 23, 2010

(54) SOLID-STATE IMAGING DEVICE DRIVING APPARATUS AND DIGITAL CAMERA

(75) Inventor: Shunsuke Suzuki, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 398 days.

(21) Appl. No.: 11/822,242

(22) Filed: Jul. 3, 2007

(65) Prior Publication Data

US 2008/0018758 A1     Jan. 24, 2008

(30) Foreign Application Priority Data

Jul. 5, 2006     (JP)     ............................ P2006-185184

(51) Int. Cl.
*H04N 5/335* (2006.01)
(52) U.S. Cl. ...................... 348/312; 348/311
(58) Field of Classification Search ........................ None
See application file for complete search history.

(56) References Cited

U.S. PATENT DOCUMENTS

| | | | | |
|---|---|---|---|---|
| 4,907,089 A | * | 3/1990 | Yamaguchi et al. | ......... 348/312 |
| 6,329,982 B1 | * | 12/2001 | Lee | .............. 345/211 |
| 6,509,927 B1 | * | 1/2003 | Prater et al. | .............. 348/222.1 |
| 6,680,751 B1 | * | 1/2004 | Kubo et al. | ................. 348/312 |
| 6,873,366 B2 | * | 3/2005 | Tashiro et al. | ............... 348/312 |
| 6,885,399 B1 | | 4/2005 | Kawashiri | |
| 7,283,167 B1 | * | 10/2007 | Schrey et al. | ............... 348/308 |
| 2001/0017659 A1 | * | 8/2001 | Suzuki | ...................... 348/312 |
| 2003/0128286 A1 | * | 7/2003 | Kubota et al. | ............... 348/296 |
| 2004/0008388 A1 | * | 1/2004 | Tanaka | ....................... 358/513 |
| 2004/0095493 A1 | * | 5/2004 | Sakakibara | ................ 348/302 |
| 2004/0095497 A1 | * | 5/2004 | Compton et al. | ............ 348/312 |
| 2006/0077276 A1 | * | 4/2006 | Noguchi | ..................... 348/312 |

FOREIGN PATENT DOCUMENTS

| | | |
|---|---|---|
| JP | 2000-350099 A | 12/2000 |
| JP | 2002-51270 A | 2/2002 |

\* cited by examiner

*Primary Examiner*—Nhan T Tran
*Assistant Examiner*—Angel L Garces-Rivera
(74) *Attorney, Agent, or Firm*—Birch, Stewart, Kolasch & Birch, LLP

(57) ABSTRACT

A solid-state imaging device driving apparatus for generating a driving pulse for a solid-state imaging device includes a status memory 48 that stores a status data at each address as a logic value, a command data memory (42, 43, 46, 47) that stores command data sequentially stored, and an output control section (49) that generates the driving pulse based on the status data read from the address, designated by each command data, of the status memory 48.

9 Claims, 9 Drawing Sheets

SOLID-STATE IMAGING DEVICE DRIVING APPARATUS AND DIGITAL CAMERA

CROSS-REFERENCE TO RELATED APPLICATIONS

This application is based upon and claims the benefit of priority from the Japanese Patent Application No. 2006-185184 filed on Jul. 5, 2006; the entire contents of which are incorporated herein by reference.

BACKGROUND OF THE INVENTION

1. Technical Field

The invention relates to an apparatus for driving a solid-state imaging device mounted on a digital camera or the like, and more particularly to a solid-state imaging device driving apparatus and a digital camera that can generate various driving pulses with using small memory resources, to drive the solid-state imaging device.

2. Description of Related Art

A CCD- or CMOS-type solid-state imaging device which is used a digital still camera, a digital video camera, a camera-equipped mobile phone, or the like (hereinafter, such an apparatus is referred to as a digital camera) is driven by driving pulses generated by an imaging device driving apparatus. In a CCD-type solid-state imaging device, for example, a vertical charge transfer path (VCCD) is driven by a vertical transfer pulse, and a horizontal charge transfer path (HCCD) is driven by a horizontal transfer pulse.

Such driving pulses are generated on the basis of data of a pulse changing point, those of a repetition number (loop number), and the like which are previously stored in a register and a memory. Many kinds of timing pulses are used for driving the solid-state imaging device. Moreover, the waveforms of the pulses are complicated depending on the difference of driving modes (for example, the normal transfer mode and the high-speed transfer mode). As a result, there arises a problem in that the amount of data used in generating the driving pulses is large, and a register and a memory for storing such data must have a large capacity.

Therefore, JP 2002-51270 A discloses such a configuration that four memories are provided. The first memory holds time series data (logical status), the second memory holds a value of a length of time period between a pulse changing point and the next changing point, the third memory holds a repetition number of logical changes during one period and the fourth memory holds a repetition number of the periods themselves. The data stored in the four memories are combined to generate various driving pulses.

Recently, user's request for a digital camera increases. In a digital camera, in order to increase functions and enhance its performance, driving pulses for a solid-state imaging device are complicated in period and pulse waveform, and the amount of data required for generating the driving pulses goes on increasing. JP 2002-51270 A can deal cope with two-mode and two-stage loop driving pulses. When further multi modes and further multi loop stages of driving pulses are required, the memory capacity must be increased.

Also, each time when the design specification of a digital camera is changed to increase functions, data for generating driving pulses are inevitably changed. When the pulse generation is not highly flexible, cost for designing pulse data would be increased.

SUMMARY OF THE INVENTION

The invention provides a solid-state imaging device driving apparatus and digital camera that enables a flexible design of data used in generating producing pulses, and can generate various driving pulses with using a small memory capacity.

According to an aspect of the invention, a solid-state imaging device driving apparatus for generating a driving pulse for a solid-state imaging device, includes a status memory, a command data memory and an output control section. The status memory stores status data at each address as a logic value. The command data memory stores command data sequentially. The output control section generates the drive pulse based on the status data read from the address, designated by each command data, of the status memory.

Also, the solid-state imaging device driving apparatus may further include a control section and a sequence section. The control section includes a serial register that receives and stores plural pieces of setting data. The sequence section operates with using an output of the serial register as address data. The sequence section generates the driving pulse by sequence control. The control section and the sequence section are provided independently. The output control section, the status memory and the command data memory are disposed in the sequence section.

Also, the solid-state imaging device may be a CCD-type solid-state imaging device comprising vertical charge transfer paths and a horizontal charge transfer path. The command data memory includes a first memory section and a second memory section. The first memory section stores command data for a plurality of horizontal transfer periods constituting one operation period in units of the horizontal transfer period. The second memory section stores command data for each horizontal transfer period in units of a clock.

Also, the second memory section may include a clock memory and a loop control memory. The clock memory stores plural pieces of command data for designating different clock waiting times at different addresses. The loop control memory stores command data for designating (i) one of the addresses of the clock memory and (ii) number of times a clock waiting time at the designated address of the clock memory is repeated.

Also, the first memory section may include a sequence memory and a loop pointer memory. The sequence memory stores command data for designating a read address of the clock memory. The loop pointer memory stores command data for, at a same timing as the designating by the command data stored in the sequence memory, designating a read address of the loop control memory.

Also, each of the status memory, the clock memory and the loop control memory may be configured to be partitioned into three groups of a first group for a vertical transfer pulse, a second group for a transfer gate pulse and a third group for a horizontal transfer pulse.

Also, when the one operation period is changed, the change of the one operation period may be dealt with by variably controlling number of repeated loops stored in the first memory section or the second memory section.

Also, when a same clock signal as a master clock is used as the driving pulse, the status memory may store data for designating through output of the master clock as the driving pulse in place of storing the status data of the driving pulse.

According to another aspect of the invention, a digital camera includes a solid-state imaging device, and any of the solid-state imaging device driving apparatuses described above for driving the solid-state imaging device.

According to the above configuration, a flexible design of data for generating driving pulses is enabled, and various driving pulses can be generated with a small memory capacity.

DETAILED DESCRIPTION OF EMBODIMENTS OF THE INVENTION

Hereinafter, embodiments of the invention will be described with reference to the accompanying drawings.

Figure 1:
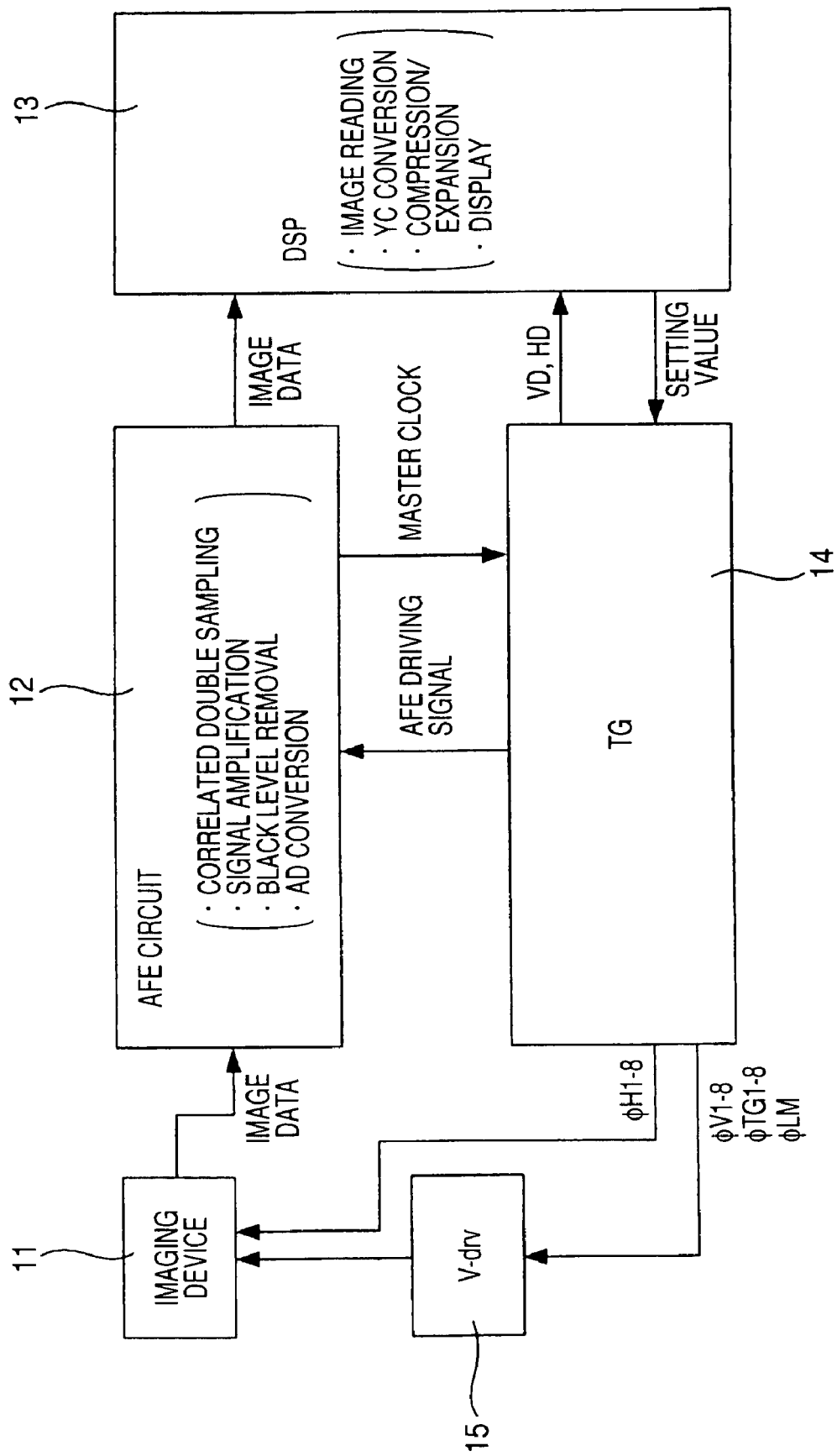
FIG. 1 is a functional block diagram showing main portions of a digital camera according to an embodiment of the invention.

FIG. 1 is a functional block diagram showing main portions of a digital camera according to this embodiment of the invention. The illustrated digital camera includes: a CCD-type solid-state imaging device 11; an analog front end (AFE) circuit 12 which receives analog image data output from the solid-state imaging device 11, and which performs a correlated double sampling process, a signal amplifying process, a black level removing process, an analog/digital (AD) converting process, and the like; a digital signal processor (DSP) 13 which receives digital image data output from the AFE circuit 12, and which performs a YC converting process, a compressing/expanding process, and the like; a timing generator (TG: a driving pulse generating circuit) 14 which will be described later in detail; and a driving circuit (V-drv) 15.

The timing generator 14 operates based on a master clock signal supplied from the AFE circuit 12, and setting value data supplied from the DSP 13. The timing generator 14 generates a horizontal synchronizing signal HD, a vertical synchronizing signal VD, horizontal transfer pulses H1 to H8, vertical transfer pulses V1 to V8, transfer gate pulses (read pulse signals) TG1 to TG8, and line memory driving pulse LM. The timing generator further generates an AFE driving signal for driving the AFE circuit 12.

The horizontal synchronizing signal HD and the vertical synchronizing signal VD are supplied from the timing generator 14 to the DSP 13. The horizontal transfer pulses H1 to H8 have a voltage as low as about 3 V, and hence are directly supplied to the solid-state imaging device 11. The vertical transfer pulses V1 to V8, the transfer gate pulses TG1 to TG8, and the line memory driving pulse LM are boosted in the driving circuit 15, and then supplied to the solid-state imaging device 11.

Figure 2:
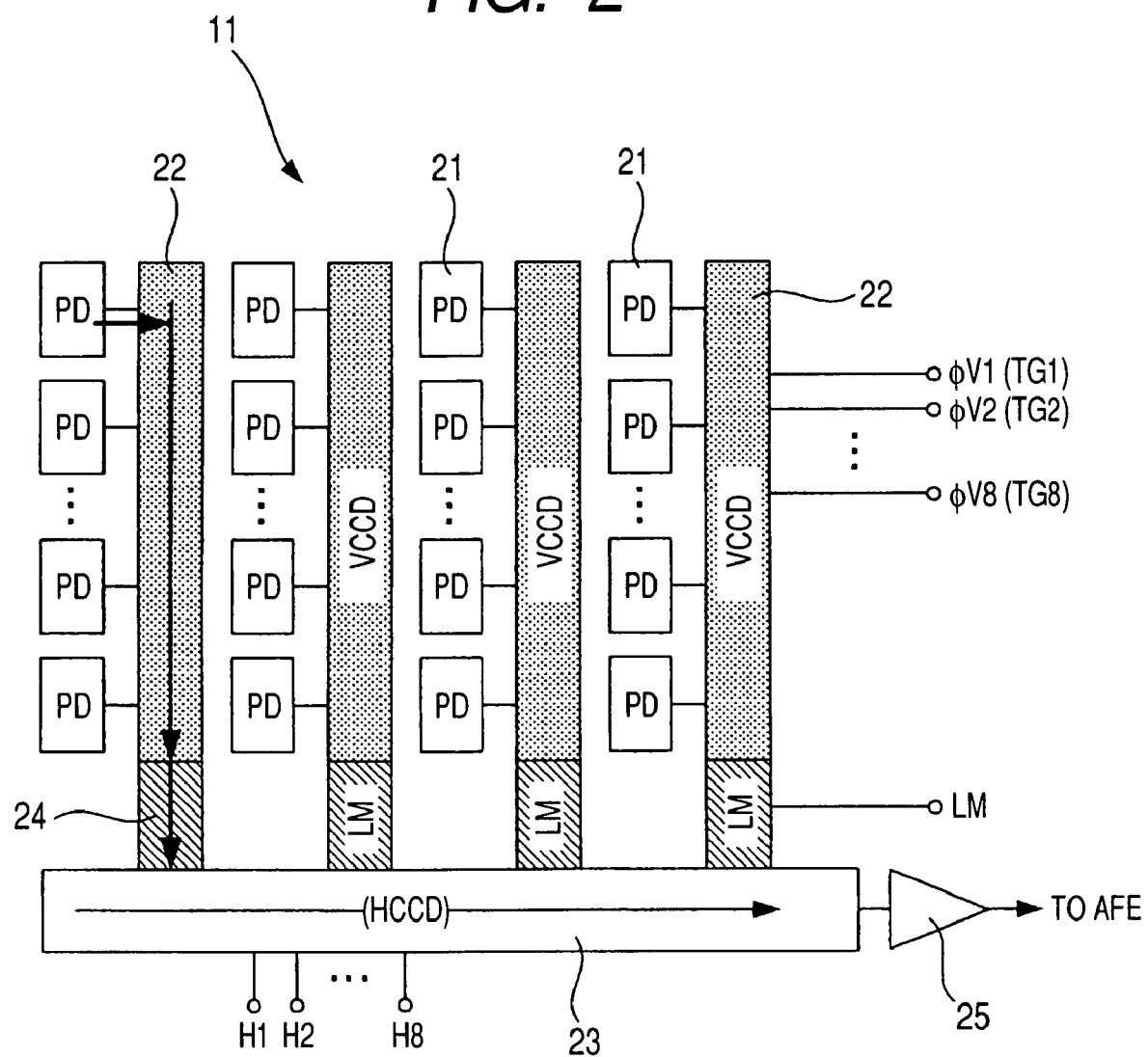
FIG. 2 is a diagram illustrating the configuration of main portions of a solid-state imaging device shown in FIG. 1.

FIG. 2 is a diagram of the solid-state imaging device 11 shown in FIG. 1. The solid-state imaging device 11 includes: many photodiodes (PD) 21 which are arranged on a surface of a semiconductor substrate in a two-dimensional array manner; vertical charge transfer paths (VCCDs) 22 which are formed along respective photodiode columns; a horizontal charge transfer path (HCCD) 23 which is formed in a lower side portion of the semiconductor substrate; line memories (LMs) 24 which are disposed between ends of the vertical charge transfer paths 22 and the horizontal charge transfer path (HCCD) 23, respectively; and an output amplifier 25 which is disposed in an output stage of the horizontal charge transfer path 23.

As disclosed in, for example, JP 2000-350099 A (corresponding to U.S. Pat. No. 6,885,399, the entire contents of which are incorporated herein by reference), each of the line memories 24 temporarily stores signal charges transferred by the corresponding vertical charge transfer path 22, and outputs the stored charges to the horizontal charge transfer path 23 in accordance with the line memory driving pulse LM. When the timing of the output is controlled, it is possible to add a pixel to the signal charges in the horizontal direction.

In the thus configured solid-state imaging device 11, when the transfer gate pulses TG1 to TG8 are applied to electrodes which, among vertical transfer electrodes constituting the vertical charge transfer paths 22, serve also as read electrodes, signal charges of corresponding photodiodes 21 are read out into a potential packet which is formed under the electrodes. Then, the vertical transfer pulses φV1 to φV8 are applied to the vertical charge transfer paths 22, whereby the signal charges on the vertical charge transfer paths 22 are transferred toward the horizontal charge transfer path 23, and the signal charges of ends of the vertical charge transfer paths 22 are transferred to the line memories 24 to be temporarily held therein.

The signal charges on the line memories 24 are transferred to the horizontal charge transfer path 23 in accordance with the line memory driving pulse φLM. The signal charges moved onto the horizontal charge transfer path 23 are transferred toward the output amplifier 25 in accordance with the horizontal transfer pulses φH1 to φH8. The output amplifier 25 supplies a signal of a voltage value corresponding to the charge amount of each of the signal charges which are sequentially transferred to the output stage of the horizontal charge transfer path 23, as image data to the AFE circuit 12.

The operations of transferring signal charges of one lateral row and on the vertical charge transfer paths 22, toward the horizontal charge transfer path 23 in accordance with the vertical transfer pulses φV1 to φV8, transferring signal charges of one lateral row from the line memories 24 to the horizontal charge transfer path 23, and, after the transfer of the signal charges of one lateral row in the horizontal direction and the output from the output amplifier 25 are ended, transferring the signal charges of the next one stage on the vertical charge transfer paths 22, toward the horizontal charge transfer path 23 are repeatedly performed.

In the above description, the terms "vertical" and "horizontal" are used. The terms mean "one direction" and "a direction substantially perpendicular to the one direction" along the light-receiving surface of the solid-state imaging device.

Figure 3:
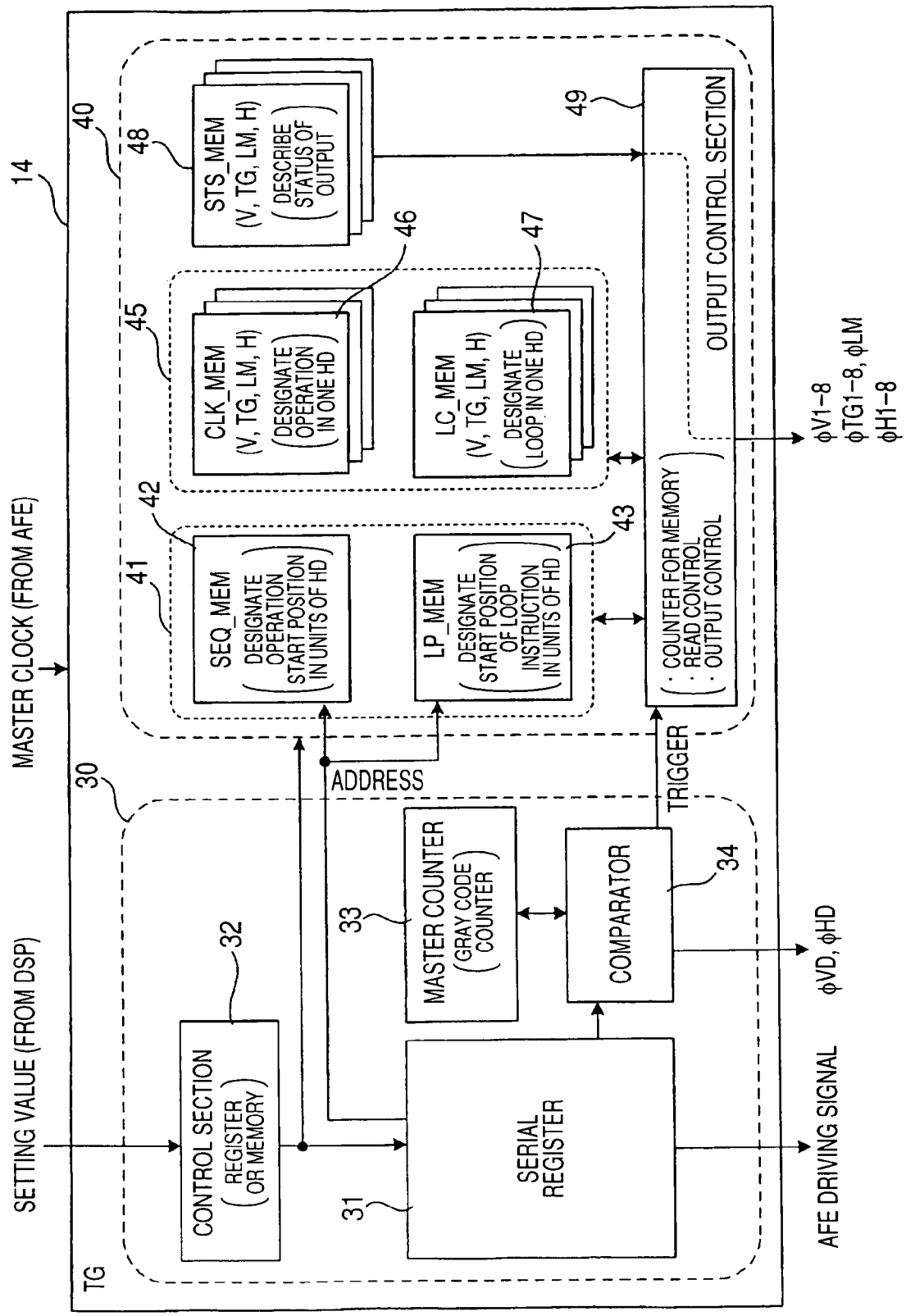
FIG. 3 is a detailed diagram of a timing generator shown in FIG. 1.

FIG. 3 is a detailed diagram of the timing generator (TG) 14 shown in FIG. 1. The timing generator 14 includes a controlling section & trigger pulse generating section (hereinafter, referred to as control/trigger pulse generating section) 30 and a sequence section 40 according to this embodiment. Number of registers can be reduced by providing the sequence section 40 and the control/trigger pulse generating section 30 separately. Also, the use performance can be improved. This is because the following reasons. In place of generating pulses by setting of registers of a TOG section, this embodiment generates pulses in the sequence section as described later. Hence, set registers can be reduced correspondingly. The pulse generation by means of sequence is more effective than that by means of registers. Moreover, data size can be reduced.

The control/trigger pulse generating section 30 receives setting value data (data used for generating an AFE drive control signal and the driving pulses $\phi H1$ to $\phi H8$, TG1 to TG8, $\phi V1$ to $\phi V8$) from the DSP 13, and outputs the AFE drive control signal and the generated vertical and horizontal synchronizing signals VD, HD.

As described later in detail, the sequence section 40 generates and outputs the horizontal transfer pulses $\phi H1$ to $\phi H8$, the vertical transfer pulses $\phi V1$ to $\phi V8$, the transfer gate pulses TG1 o TG8, and the line memory driving pulse $\phi LM$.

The control/trigger pulse generating section 30 includes: a serial register 31 into which the setting value data supplied from the DSP 13 is written; a control section 32 which controls operations of writing into the serial register 31 and memories 42, 43, 46, 47, 48 (described later) of the sequence section 40; a master counter 33 configured by a gray code counter; and a comparator 34.

The comparator 34 compares data relating to the horizontal synchronizing signal HD and data relating to the vertical synchronizing signal VD among data written into the serial register 31, with an output value of the master counter 33. Then, the comparator 34 outputs the horizontal synchronizing signal HD and the vertical synchronizing signal VD to the DSP 13, and outputs a trigger signal to the sequence section 40. Also, the serial register 31 outputs pulses for generating driving pulses, as address data, to the sequence section 40.

The sequence section 40 includes a first memory section 41, a second memory section 45, a status memory (STS_MEM) 48 and an output control section 49.

The first memory section 41 includes a sequence memory (SEQ_MEM) 42 and a loop pointer memory (LP_MEM) 43. In response to the same address signal supplied from the control/trigger pulse generating section 30, command data at the same address are read out from the memories 42, 43 at the same timing.

The sequence memory 42 stores command data for designating an operation start position in units of the horizontal synchronizing signal HD. The loop pointer memory 43 stores command data for designating a start position of a loop instruction in the unit of the horizontal synchronizing signal HD.

The second memory section 45 includes a clock memory (CLK_MEM) 46 and a loop control memory (LC_MEM) 47. Each of the memories 46, 47 is configured to be partitioned into three groups, that is, a group for "vertical transfer pulse", a group for "transfer gate and line memory driving pulse", and a group for "horizontal transfer pulse." The designer may arbitrary set how each memory is divided (partitioned). In this embodiment, the three-group configuration provide the most efficiently partitioning of each memory.

The clock memory 46 stores command data for designating an operation in one horizontal synchronization period HD. The command data is read out from the clock memory 46 with an output of the sequence memory 42 being used as a read address, and is then output.

The loop control memory 47 stores command data for designating a loop in one horizontal synchronization period HD. The command data is read out from the loop control memory 47 with an output of the loop pointer memory 43 being used as a read address, and the read-out command data designates a read address for executing a loop in the clock memory 46.

The status memory (STS_MEM) 48 describes output statuses of the driving pulses as data. The status data is output to the output control section 49 with an output of the second memory section 45 being used as an read address.

In response to the trigger signal output from the comparator 34 of the control/trigger pulse generating section 30, the output control section 49 operates to control the first and second memory sections 41, 45, and output the status data supplied from the status memory 48 as the driving pulses $\phi V1$ to $\phi V8$, TG1 to TG8, $\phi LM$, $\phi H1$ to $\phi H8$. Under certain conditions which will be described later, the master clock signal given from the AFE circuit 12 to the timing generator 14 is output as it is, as the driving pulses.

The command data and the status data which are to be stored in the memories 42, 43, 46, 47, 48 are output from the DSP 13, then given from the control section 32 to the sequence section 40, and stored in the corresponding memories.

Figure 4:
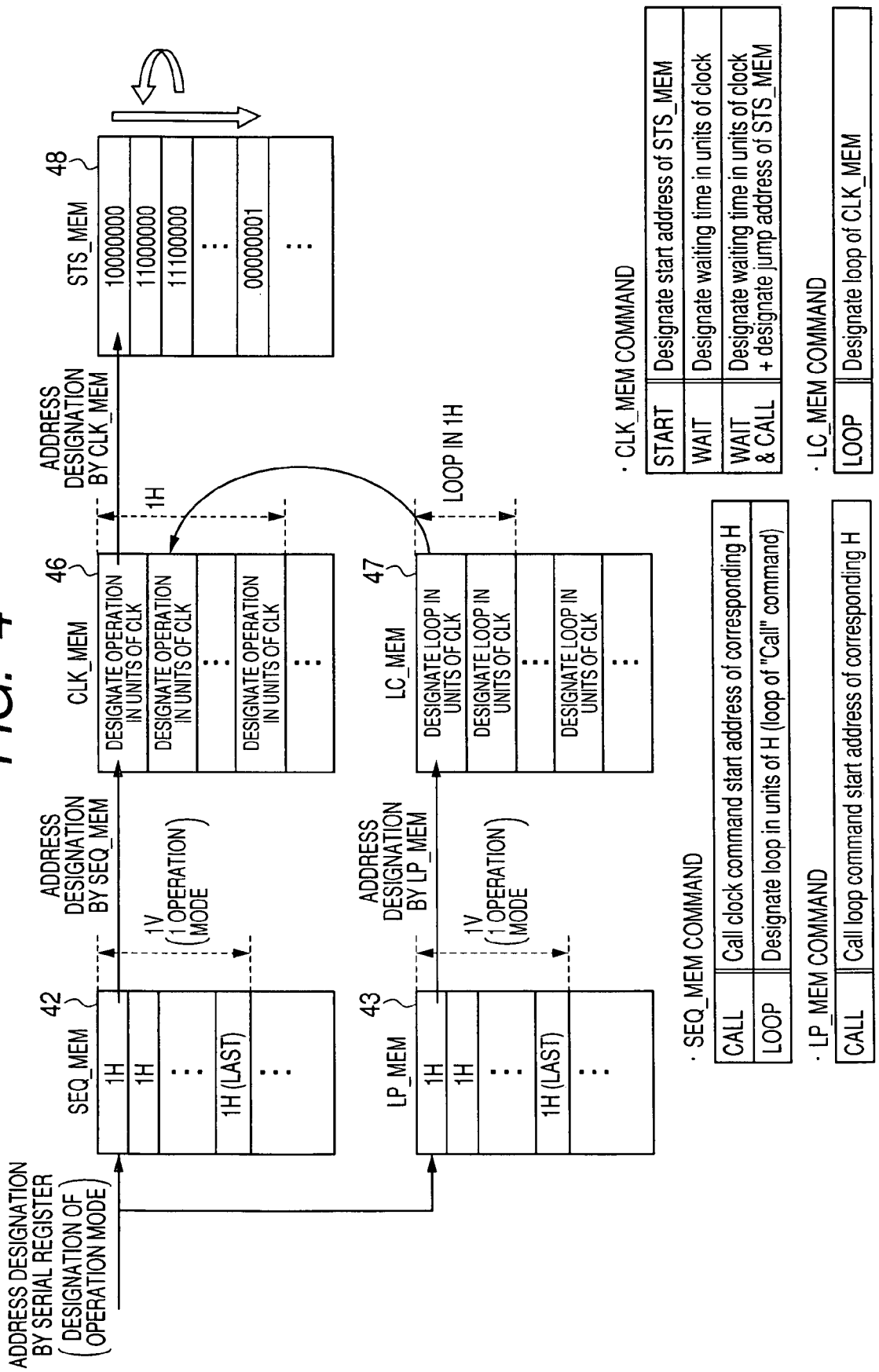
FIG. 4 is a diagram illustrating the operation of the timing generator shown in FIG. 3.

FIG. 4 is a diagram illustrating the operation of the sequence section 40. Examples of command data to be stored in the sequence memory 42 are a call command and a loop command. The call command is a command for calling a clock command start address in a corresponding horizontal synchronization period. The loop command is a command for designating a loop (a loop of the call command) in units of a horizontal synchronization period.

An example of command data to be stored in the loop pointer memory 43 is a call command. The call command is a command for calling a loop command start address in a corresponding horizontal synchronization period.

An address of the sequence memory 42 and an address of the loop pointer memory 43 are designated by data output from the serial register 31. An address of the clock memory 46 is designated by data read out from the sequence memory 42. An address of the loop control memory 47 is designated by data read out from the loop pointer memory 43.

Examples of command data to be stored in the clock memory 46 are a start command, a wait command, and a wait & call command. The start command is a command for designating a start address of the status memory 48. The wait command is a command for designating a waiting time in units of the clock. The wait & call command is a command for designating a waiting time in units of the clock, and designating a jump address of the status memory 48.

An example of command data to be stored in the loop control memory 47 is a loop command. The loop command is a command for designating a loop of the clock memory 46.

The status memory 48 stores statuses in form of a binary logic value, and outputs a status at the designated address which is read out from the clock memory 46. The driving pulses are generated based on a change of the status which is read out from the status memory 48. Normally, the read address of the status memory 48 is incremented one by one. However, address jumping may be sometimes caused by a command of the clock memory 46.

Figure 5:
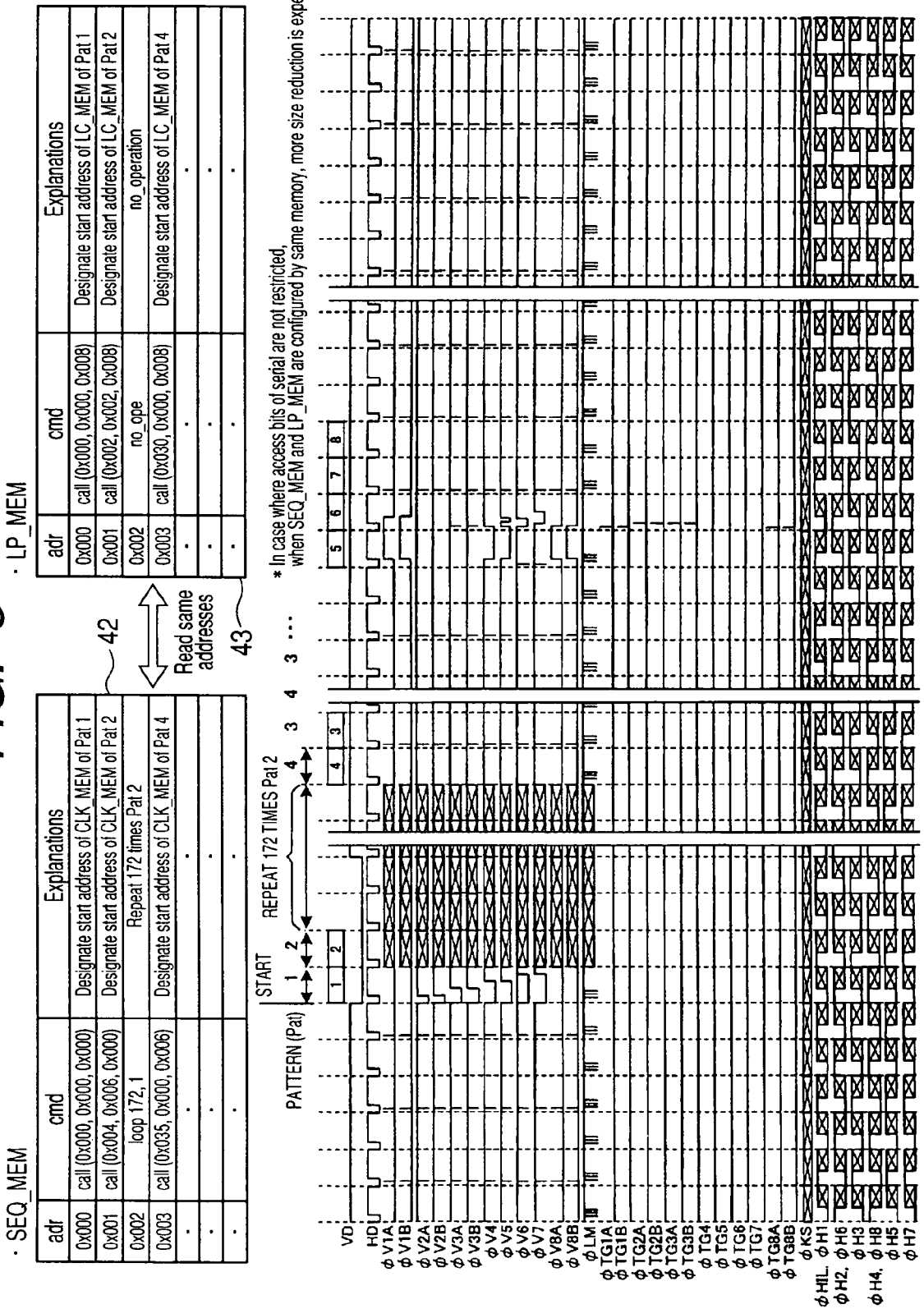
FIG. 5 is a timing chart of driving pulses showing relationships between a sequence memory and a loop pointer memory shown in FIG. 4.

FIG. 5 is a timing chart of the driving pulses. This timing chart shows a high-speed sweep drive which is performed before a signal output from the CCD-type solid-state imaging device, and reading out of signal charges from the photodiodes to the vertical charge transfer paths, which is executed subsequent to the sweep drive.

Upon start, first, the drive of the vertical charge transfer paths is started by the waveforms of Pattern (Pat) 1, and then the sweep drive is performed by repeating 172 times Pattern 2 of high-speed pulse waveforms. Thereafter, Pattern 4, Pattern 3, Pattern 4, Pattern 3, . . . are repeated, and Pattern 5 is then driven, to thereby perform idle transfer on the vertical charge transfer paths. In Pattern 6, the transfer gate pluses are applied to read out the signal charges from the corresponding photodiodes to the vertical charge transfer paths. Thereafter, the process proceeds to Patterns 7, 8, . . . .

In order to allow the sequence section 40 to generate the driving pulses of Patterns 1, 2 . . . shown in FIG. 5, in this embodiment, a command for designating a clock memory start address for Pattern 1 is stored at address "0x000" of the sequence memory 42 as shown in the upper left portion of FIG. 5. At the next address "0x001", a command for designating a clock memory start address for Pattern 2 is stored. At the further next address "0x002", a command for designating the operation of repeating Pattern 2 172 times is stored. At the still further next address "0x003", a command for designating a clock memory start address for Pattern 4 is stored.

In the loop pointer memory 43, address designation is performed in the same manner as that in the sequence memory 42. As shown in the upper right portion of FIG. 5, a command for designating a loop control memory start address for Pattern 1 is stored at address "0x000" of the loop pointer memory 43, a command for designating a loop control memory start address for Pattern 2 is stored at the next address "0x001", no operation (a command for performing nothing) is stored at the further next address "0x002", and a command for designating a loop control memory start address for Pattern 4 is stored at the still further next address "0x003."

Figure 6:
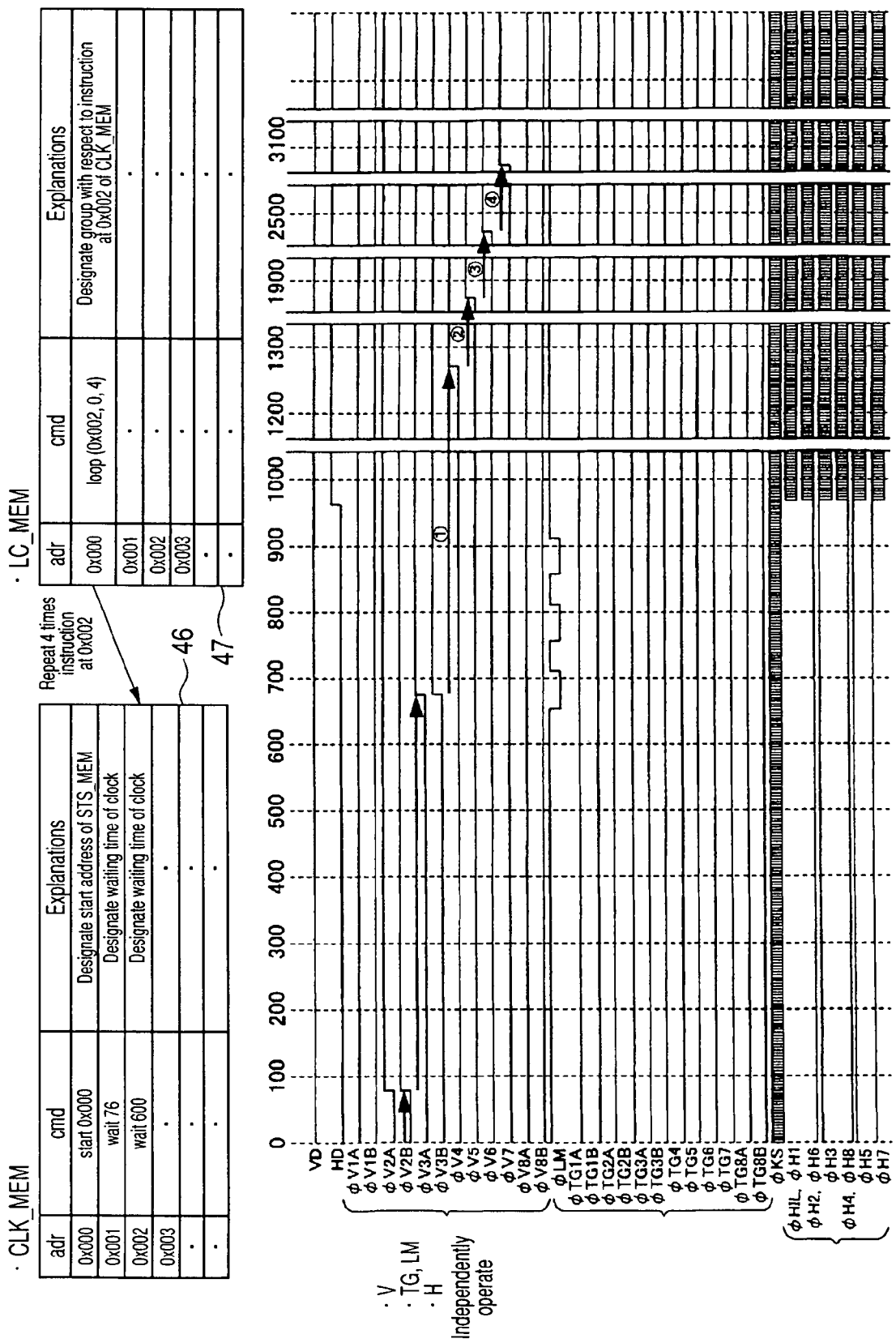
FIG. 6 is an enlarged timing chart of Pattern 1 of FIG. 5 showing relationships between a clock memory and a loop control memory shown in FIG. 4.

FIG. 6 is an enlarged view of Pattern 1 shown in FIG. 5. In Pattern 1, timings at which the transfer pulses φV2, φV3, . . . , φV7 are applied to the vertical transfer electrodes V2, V3, . . . , V7 are shifted from one another. The transfer pulses are deigned so that the transfer pulse φV2 rises after waiting time "76" (counted by the number of clock pulses, the same will apply hereinafter) has elapsed after starting timing 0. The transfer pulse φV3 rises after waiting time "600" has elapsed with respect to the transfer pulse φV2. Thereafter, each of the transfer pulses φV4, φV5, φV6, φV7 similarly rises after elapse of waiting time "600".

In order to perform the pulse design, as shown in the upper left portion of FIG. 6, a command for designating a status memory start address is written at address "0x000" of the clock memory 46, a command for designating the clock waiting time "76" is written at address "0x001", and a command for designating the clock waiting time "600" is written at address "0x002".

The clock waiting time "600" for the initial transfer pulse φV3 is performed also for φV4, φV5, φV6, φV7, that is, is repeated four times. When the clock waiting times are sequentially written into subsequent addresses of the clock memory 46, the storage capacity for the command data is increased.

In this embodiment, therefore, a command for designating a loop of repeating four times the instruction command at address "0x002" of the clock memory 46 is written at address "0x000" of the loop control memory 47 as shown in the upper right portion of FIG. 6. As a result, the instruction of waiting time "600" is repeated four times, and the respective pulse waveforms are generated as described with reference to FIG. 7 below.

Figure 7:
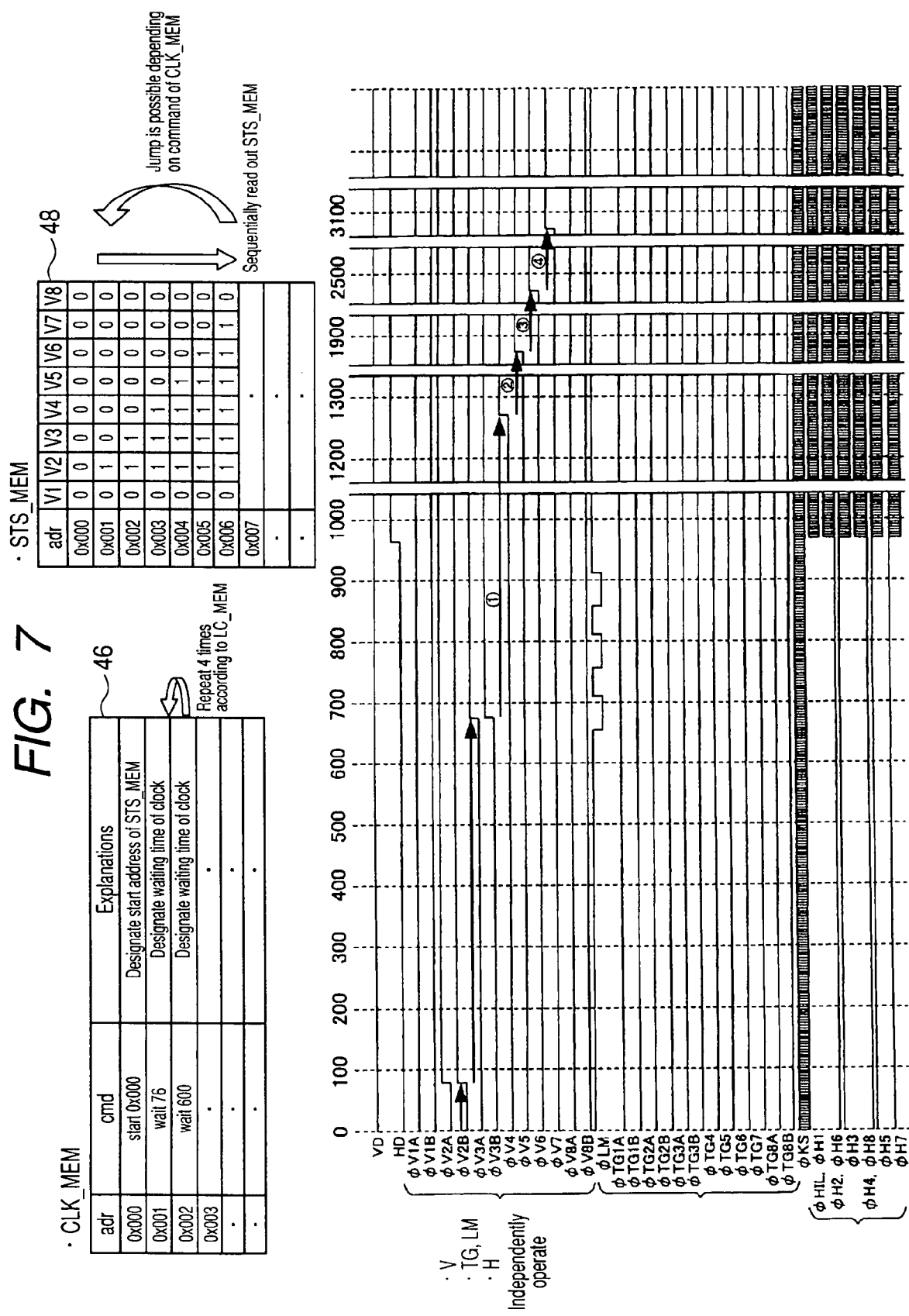
FIG. 7 is a timing chart of the driving pulses, in a similar manner as FIG. 6, and showing the relationships between the clock memory and a status memory shown in FIG. 4.

FIG. 7 is a timing chart showing relationships between the clock memory 46 and the status memory 48. In the status memory 48, status data for setting all of the electrodes V1, V2, . . . , V8 to level "0" is stored at address "0x000", that for setting only the electrode V2 to level "1" is stored at address "0x001", that for setting the electrodes V2, V3 to level "1" is stored at address "0x002", that for setting the electrodes V2, V3, V4 to level "1" is stored at address "0x003", . . . , and that for setting the electrodes V2, V3, V4, V5, V6, V7 to level "1" is stored at address "0x006".

The operation of reading data from the status memory 48 in which the pieces of such status data are stored is performed in the sequence of addresses. The timing of data reading is adjusted in accordance with the command data (the wait command, the loop command) stored in the second memory section 45.

When the command at address "0x000" of the clock memory 46 is executed, first, the start address of the status memory 48 is designated. In the illustrated example, the start address "0x000" of the status memory 48 is designated, and hence the potentials of all the electrodes V1, V2, . . . , V8 are set to level "0."

The command at the next address "0x001" of the clock memory 46 designates the waiting time "76. " Therefore, the status data at the next address "0x0011" of the status memory 48 is read out after elapse of the waiting time "76. " As a result, the potential of the electrode V2 rises to level "1" after elapse of the waiting time "76" from the starting timing.

The status data at the next address "0x002" of the status memory 48 is data for setting the electrodes V2, V3 to level "1. " This status data is read out in accordance with the command at the next address "0x002" of the clock memory 46, i.e., after elapse of the waiting time "600." Therefore, the potential of the electrode V3 rises to level "1" after elapse of the waiting time "600" from the rising of the potential of the electrode V2 to level "1."

The command for designating the waiting time "600" at the address "0x002" of the clock memory 46 is designated, by the loop control memory 47, to be repeated four times (see FIG. 6). Therefore, the status data at the next address "0x003" of the status memory 48 is read out after elapse of the waiting time "600", that at the next address "0x004" of the status memory 48 is read out after further elapse of the waiting time "600", . . . , and that at address "0x006" of the status memory 48 is read out after elapse of the waiting time "600" from reading out of the status data at address "0x005" of the status memory 48.

When the execution of the four loops designated at address "0x000" of the loop control memory 47 is ended, the operation for one horizontal transfer period caused by the command at addresses "0x00" to "0x002" of the clock memory 46 is ended.

Figure 8:
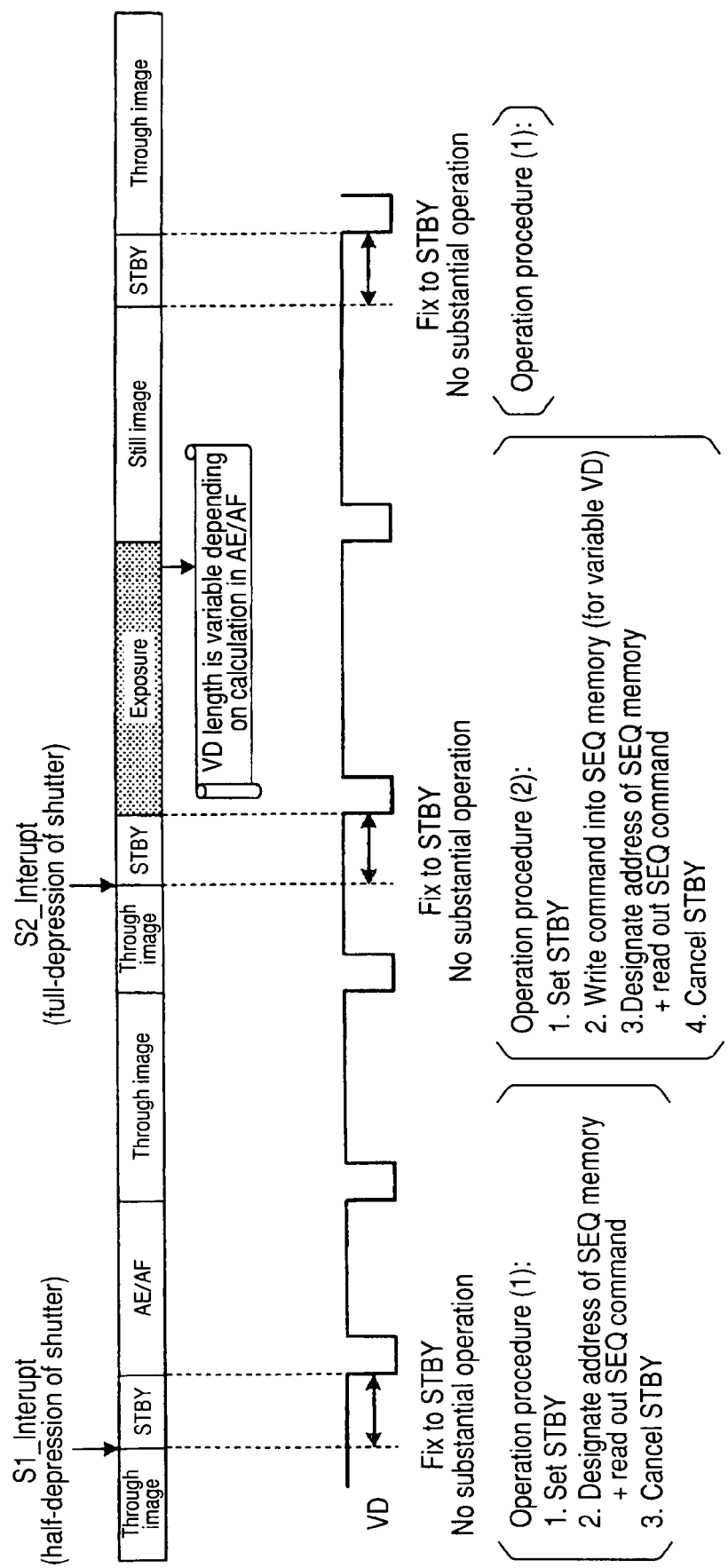
FIG. 8 is a timing chart in the case where a still image is taken by the digital camera of the embodiment.

FIG. 8 is a timing chart in the case where the digital camera takes a still image. In a state where the digital camera is powered on, image data output from the solid-state imaging device is displayed as one image on a liquid crystal display unit provided on the back face of the digital camera. When a user half-depresses a shutter button (a switch S1 is turned on), calculation processes for automatic exposure (AE) and for automatic focusing (AF) are performed after elapse of a predetermined standby (STBY) time, and then a through image is displayed.

When the user next fully depresses the shutter button (a switch S2 is turned on), "exposure" is performed after elapse of the predetermined standby (STBY) time, and the operation of reading out imaged image data from the solid-state imaging device is performed subsequently.

The time period for "exposure" is variable depending on the results of the immediately preceding AE and AF, and also the required number of the driving pulses of the solid-state imaging device is variable. Therefore, the digital camera of this embodiment is configured so that, during the standby mode after the switch S2 is turned on, the sequence memory 42 is accessed and the loop number of the required pattern waveform to be written into the sequence memory 42 is increased or decreased depending on the exposure time. In this configuration where the data stored in the sequence memory 42 are overwritten during the operation of the digital camera as described above, even when a driving mode other than expected is required, it is possible to avoid a situation where the memory capacity becomes insufficient.

Figure 9:
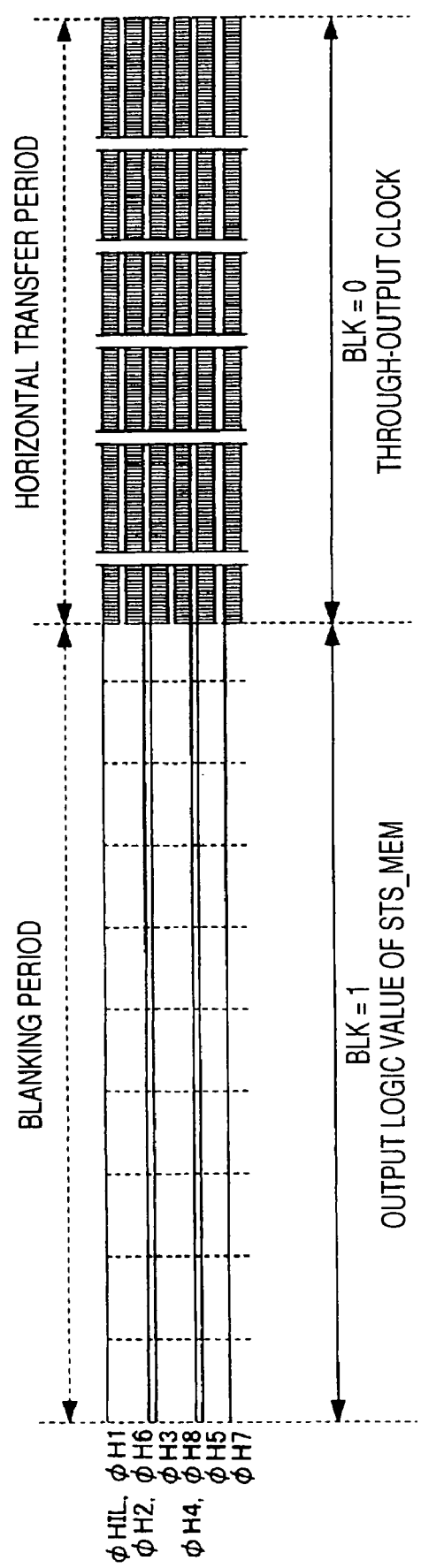
FIG. 9 is a timing chart of the blanking and horizontal transfer periods of a horizontal charge transfer path.

FIG. 9 is a view showing the configuration of the status memory 48 for the horizontal transfer pulses φH1 to φH8, and a control of the pulses. The horizontal transfer pulses function as the clock output during the horizontal transfer period. If these clock logic values are actually written into the status memory 48, the amount of stored data is excessively large.

In this embodiment, therefore, a BLK portion is provided in the status memory 48 for the horizontal transfer pulses as shown in the upper left portion of FIG. 9, "0" is written into the BLK portion at address "0x001" indicating the horizontal transfer, and "1" is written into the BLK portion at address "0x000" indicating the blanking.

According to this configuration, during the blanking period, the status data at address "0x000" of the status memory 48 are output. Also, during the horizontal transfer period, the master clock supplied from the AFE circuit 12 (in this embodiment, the master clock is generated by the AFE circuit 12, but alternatively it may be generated by the timing generator 14, and then supplied to other circuits) is through-output as it is, as the horizontal transfer pulse. According to this configuration, it is not necessary to store the clock data into the status memory 48, and therefore the memory capacity can be reduced.

As described above, the digital camera of this embodiment is configured so that data for designating operations for one operation mode (operations in a period from a vertical synchronizing pulse VD to the next vertical synchronizing pulse VD) are stored in the sequence memory 42 and the loop pointer memory 43 in units of the horizontal transfer. The operations for one horizontal transfer are stored in the clock memory 46 in units of the clock. A loop instruction corresponding to the horizontal transfer period is stored in the loop control memory 47. Transitions of logic values are stored in the status memory 48. The sequence section 40 having the memories 42, 43, 46, 47, 48 is caused to start a sequence operation by the start address designated in the serial register 31. Therefore, various and complicated driving pulses can be generated by the data stored in the memories having a small capacity.

In the timing generator 14 of this embodiment, the data communication is performed by the serial communication. In the case where the access bits of the serial communication are not restricted, the sequence memory 42 and the loop pointer memory 43 may be configured of the same memory. Hence, the memory size can be further reduced.

The embodiment is configured so that the clock and loop commands which are stored in the second memory section 45 are stored in the different memories 46, 47, respectively, and separately readout therefrom. Therefore, the loop determination can be performed without time delay or simultaneously with the clock command. According to this configuration, the reading timing due to the loop determination is not restricted, and it is possible to cope with the wait command for each clock.

In this embodiment, an address of the clock memory at which a loop is required is designated by the loop command of the loop control memory 47, and therefore it is possible to cope with a multi-stage loop or a nested loop without increasing the memories. When the chip size and the disposition of a multi-stage counter are not restricted, any number of multi-stage loops can be incorporated.

In this case, as a method of indicating the end of a loop operation in one horizontal transfer period, one of the following three methods may be employed:
(a) a loop of fixed stages is used;
(b) a control register for designating the number of loop stages is disposed, and a variable-stage loop due to the setting of the register is used; and
(c) an end bit is disposed in a loop instruction in the loop control memory, and a variable-stage loop due to the command setting is used.

In this embodiment, furthermore, command data are used as data to be stored in the memories, and the loop instruction is effectively used to realize a multi-stage loop. Therefore, the capacity of the memories for storing the command data can be reduced. Also the status memory 48 is configured so that address call is performed by the call command. Therefore, also the data capacity of the status data can be reduced, and the size of the memory chip can be further reduced.

In this embodiment, one operation mode is partitioned in units of a horizontal transfer period, and one horizontal transfer period is partitioned in units of the clock. Therefore, the combination can be easily changed, and the flexibility of the pulse production can be enhanced.

Alternatively, the loop pointer memory 43 and the loop control memory 47 may not be used, and the loop instruction may be incorporated in the clock memory. In the alternative, however, it is required that the loop instruction in the clock memory is once determined and then the instruction at the loop destination is read. In the reading timing, therefore, one clock for the loop determination, and one clock for reading the instruction at the loop destination, or two clocks in total are restricted. In a system in which such restriction is allowable, the memory capacity can be further reduced.

In the solid-state imaging device driving apparatus of the invention, various pulses of driving an imaging device can be produced with using a small memory capacity. Therefore, the apparatus is useful in application to a digital camera in which functions are to be increased, etc.

What is claimed is:

1. A solid-state imaging device driving apparatus for generating a driving pulse for a solid-state imaging device, the apparatus comprising:
   a status memory that stores status data at each address as a logic value;
   a command data memory that stores command data sequentially;
   an output control section that generates the drive pulse based on the status data read from the address, designated by each command data, of the status memory;
   a control section comprising a serial register that receives and stores plural pieces of setting data; and
   a sequence section that operates with using an output of the serial register as address data, the sequence section that generates the driving pulse by sequence control, wherein:

the control section and the sequence section are provided independently, and the output control section, the status memory and the command data memory are disposed in the sequence section.

2. The apparatus according to claim 1, wherein:

the solid-state imaging device is a CCD-type solid-state imaging device comprising vertical charge transfer paths and a horizontal charge transfer path, and the command data memory comprises a first memory section that stores command data for a plurality of horizontal transfer periods constituting one operation period in units of the horizontal transfer period, and a second memory section that stores command data for each horizontal transfer period in units of a clock.

3. The apparatus according to claim 2, wherein the second memory section comprises a clock memory that stores plural pieces of command data for designating different clock waiting times at different addresses, and a loop control memory that stores command data for designating (i) one of the addresses of the clock memory and (ii) number of times a clock waiting time at the designated address of the clock memory is repeated.

4. The apparatus according to claim 3, wherein the first memory section comprises a sequence memory that stores command data for designating a read address of the clock memory; and a loop pointer memory that stores command data for, at a same timing as the designating by the command data stored in the sequence memory, designating a read address of the loop control memory.

5. The apparatus according to claim 3, wherein each of the status memory, the clock memory and the loop control memory are configured to be partitioned into three groups of a first group for a vertical transfer pulse, a second group for a transfer gate pulse and a third group for a horizontal transfer pulse.

6. The apparatus according to claim 4, wherein each of the status memory, the clock memory and the loop control memory are configured to be partitioned into three groups of a first group for a vertical transfer pulse, a second group for a transfer gate pulse and a third group for a horizontal transfer pulse.

7. The apparatus according to claim 2, wherein when the one operation period is changed, the change of the one operation period is dealt with by variably controlling number of repeated loops stored in the first memory section or the second memory section.

8. The apparatus according to claim 1, wherein when a same clock signal as a master clock is used as the driving pulse, the status memory stores data for designating through output of the master clock as the driving pulse in place of storing the status data of the driving pulse.

9. A digital camera comprising:

a solid-state imaging device; and the solid-state imaging device driving apparatus, according to claim 1, for driving the solid-state imaging device.

* * * * *